(12) United States Patent
Kawamura

(10) Patent No.: US 12,110,030 B2
(45) Date of Patent: Oct. 8, 2024

(54) VEHICLE BEHAVIOR ESTIMATION SYSTEM AND VEHICLE BEHAVIOR ESTIMATION METHOD

(71) Applicant: TOYOTA JIDOSHA KABUSHIKI KAISHA, Aichi-ken (JP)

(72) Inventor: Yusuke Kawamura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 226 days.

(21) Appl. No.: 17/972,590

(22) Filed: Oct. 25, 2022

(65) Prior Publication Data

US 2023/0150516 A1 May 18, 2023

(30) Foreign Application Priority Data

Nov. 18, 2021 (JP) ................................. 2021-188161

(51) Int. Cl.
| | |
|---|---|
| *B60W 40/11* | (2012.01) |
| *B60W 40/114* | (2012.01) |
| *G07C 5/00* | (2006.01) |
| *G07C 5/02* | (2006.01) |

(52) U.S. Cl.
CPC .......... *B60W 40/114* (2013.01); *G07C 5/008* (2013.01); *G07C 5/02* (2013.01); *B60W 2520/10* (2013.01); *B60W 2520/14* (2013.01); *B60W 2540/18* (2013.01)

(58) Field of Classification Search
CPC .......... B60W 40/114; B60W 2520/10; B60W 2520/14; B60W 2540/18; B60W 40/09; B60W 40/10; B60W 50/02; B60W 40/00; B60W 2510/20; B60W 2520/00; G07C 5/008; G07C 5/02; G07C 5/0808; B62D 15/02
See application file for complete search history.

(56) References Cited

U.S. PATENT DOCUMENTS

| 10,262,476 B2 * | 4/2019 | Dudar .................. G05D 1/0291 |
| 2002/0059821 A1 * | 5/2002 | Ashrafi ..................... B62D 6/04 |
| | | 73/117.02 |

FOREIGN PATENT DOCUMENTS

JP 200171925 A 3/2001

* cited by examiner

*Primary Examiner* — Michael V Kerrigan
(74) *Attorney, Agent, or Firm* — HAUPTMAN HAM, LLP

(57) ABSTRACT

A vehicle behavior estimation system includes: a yaw rate sensor that detects a yaw rate of a diagnosis target vehicle; a vehicle speed sensor that detects a vehicle speed of the diagnosis target vehicle; and a processor. The processor acquires a first curvature that is a curvature of a traveling locus of the diagnosis target vehicle based on the yaw rate and the vehicle speed, and performs a driving diagnosis related to steering of the diagnosis target vehicle based on a criterion and a curvature-related value. The criterion defines a relationship between a steering angle-related value that is a value based on a steering angle of a steering wheel of a reference vehicle that is a vehicle different from the diagnosis target vehicle and a behavior of the reference vehicle caused by steering. The curvature-related value is a value based on the first curvature.

5 Claims, 10 Drawing Sheets

| VEHICLE SPEED V2 | STEERING ANGULAR ACCELERATION STa2 | SCORE |
|---|---|---|
| V2 < A | STa2 < ×1 | 10 POINTS |
| V2 < A | STa2 ≥ ×1 | 1 POINT |
| A ≤ V2 < B | STa2 < ×2 | 10 POINTS |
| A ≤ V2 < B | STa2 ≥ ×2 | 1 POINT |
| V2 ≥ B | STa2 < ×3 | 10 POINTS |
| V2 ≥ B | STa2 ≥ ×3 | 1 POINT |

VEHICLE BEHAVIOR ESTIMATION SYSTEM AND VEHICLE BEHAVIOR ESTIMATION METHOD

CROSS-REFERENCE TO RELATED APPLICATION

This application claims priority to Japanese Patent Application No. 2021-188161 filed on Nov. 18, 2021, incorporated herein by reference in its entirety.

BACKGROUND

1. Technical Field

The present disclosure relates to a vehicle behavior estimation system and a vehicle behavior estimation method.

2. Description of Related Art

Japanese Unexamined Patent Application Publication No. 2001-71925 (JP 2001-71925 A) discloses an embodiment in which a vehicle is controlled by using a detection value of a steering angle sensor that detects a steering angle of a steering wheel. In this disclosure, when the pulse output by the steering angle sensor is interrupted, the actual steering angle of the vehicle which is measured by the steering angle sensor before the pulse is interrupted is compared with the estimated steering angle estimated from the actual yaw rate and the vehicle speed of the vehicle. When the actual steering angle and the estimated steering angle do not match, the control of the vehicle using the steering angle sensor is prohibited.

SUMMARY

The diameter of the wheels is different for each vehicle. Further, the amount of change in the steered angle of the steered wheel when the steering angle of the steering wheel changes by a unit angle differs for each vehicle. The relationship between the detection value of the steering angle sensor and the behavior of the vehicle caused by the steering of the steering wheel thus differs for each vehicle. Therefore, the driving diagnosis of each vehicle related to steering cannot be executed based on one criterion that defines the relationship between the detection value of the steering angle sensor and the behavior of the vehicle caused by the steering of the steering wheel.

In consideration of the above facts, an object of the present disclosure is to obtain a vehicle behavior estimation system and a vehicle behavior estimation method capable of executing a driving diagnosis related to steering of a plurality of vehicles based on one criterion.

A vehicle behavior estimation system described in claim 1 includes: a yaw rate sensor that detects a yaw rate of a diagnosis target vehicle; a vehicle speed sensor that detects a vehicle speed of the diagnosis target vehicle; and a processor. The processor acquires a first curvature that is a curvature of a traveling locus of the diagnosis target vehicle based on the yaw rate and the vehicle speed, and performs a driving diagnosis related to steering of the diagnosis target vehicle based on a criterion and a curvature-related value. The criterion defines a relationship between a steering angle-related value that is a value based on a steering angle of a steering wheel of a reference vehicle that is a vehicle different from the diagnosis target vehicle and a behavior of the reference vehicle caused by steering. The curvature-related value is a value based on the first curvature.

The processor of the vehicle behavior estimation system described in claim 1 acquires a first curvature that is a curvature of a traveling locus of the diagnosis target vehicle based on the yaw rate and the vehicle speed. The processor further performs a driving diagnosis related to steering of the diagnosis target vehicle based on a criterion and a curvature-related value. The criterion defines a relationship between a steering angle-related value that is a value based on a steering angle of a reference vehicle that is a vehicle different from the diagnosis target vehicle and a behavior of the reference vehicle caused by steering. The curvature-related value is a value based on the first curvature. The relationship between the curvature of the traveling locus when the vehicle is steered and the behavior of the vehicle caused by the steering of the steering wheel is substantially the same for all vehicles. Furthermore, there is a correlation between the curvature and the steering angle of the vehicle. A driving diagnosis related to the steering of the diagnosis target vehicle can therefore be executed based on the criterion that defines the relationship between the steering angle-related value of the reference vehicle and the behavior of the vehicle caused by the steering, and the curvature-related value of the diagnosis target vehicle. In other words, the vehicle behavior estimation system described in claim 1 and the vehicle behavior estimation method can execute the driving diagnosis related to the steering of the reference vehicle and the diagnosis target vehicle based on one criterion.

In the disclosure described in claim 1, the vehicle behavior estimation system according to the disclosure described in claim 2 includes: a first map showing a relationship between a detection value of a first steering angle sensor that is a steering angle sensor of the diagnosis target vehicle and the first curvature; and a second map showing a relationship between a detection value of a second steering angle sensor that is a steering angle sensor of the reference vehicle and a second curvature that is a curvature of a traveling locus of the reference vehicle. The processor applies the first curvature to the second map as an argument to acquire a corrected steering angle that is a corrected value of a steering angle of the diagnosis target vehicle. The first curvature is acquired by applying the detection value of the first steering angle sensor to the first map. The processor performs a driving diagnosis related to the steering of the diagnosis target vehicle based on a corrected curvature-related value that is a value based on the corrected steering angle and the criterion.

In the disclosure described in claim 2, the processor applies the first curvature to the second map as an argument to acquire a corrected steering angle that is a corrected value of a steering angle of the diagnosis target vehicle. The first curvature is acquired by applying the detection value of the first steering angle sensor to the first map. Further, the processor performs a driving diagnosis related to the steering of the diagnosis target vehicle based on a corrected curvature-related value that is a value based on the corrected steering angle and the criterion. It is known that there is a correlation between the curvature and the steering angle of the vehicle. The first map and the second map represent this correlation. Further, the behavior caused by the steering of the diagnosis target vehicle when the steering angle of the diagnosis target vehicle corresponds to a predetermined curvature is substantially the same as the behavior caused by the steering of the reference vehicle when the steering angle of the reference vehicle corresponds to the above curvature.

This makes it possible to perform a driving diagnosis related to the steering of the diagnosis target vehicle based on the criterion and the corrected curvature-related value. Further, the detection accuracy of the steering angle sensor is generally higher than the detection accuracy of the yaw rate sensor. Therefore, the vehicle behavior estimation system according to the disclosure described in claim 2 can execute a driving diagnosis related to the steering of the diagnosis target vehicle with higher accuracy than the vehicle behavior estimation system according to the disclosure described in claim 1.

In the disclosure described in claim 2, in the vehicle behavior estimation system according to the disclosure described in claim 3, the first map is created based on an average value of values obtained by the first curvature and the detection value of the first steering angle sensor, and the second map is created based on an average value of values obtained by the second curvature and the detection value of the second steering angle sensor.

In the disclosure described in claim 3, the first map is created based on the average value of the values obtained by the first curvature and the detection value of the first steering angle sensor. Generally, the detection accuracy of the yaw rate sensor is not high. However, the first map created in this way more accurately represents the relationship between the steering angle and the curvature of the diagnosis target vehicle as compared with the first map created not based on the average value. Therefore, the reliability of the first map of the disclosure described in claim 3 is high.

In the disclosure described in claim 2 or 3, in the vehicle behavior estimation system according to the disclosure described in claim 4, the processor creates the first map based on detection values of the yaw rate sensor, the vehicle speed sensor, and the first steering angle sensor of the diagnosis target vehicle.

In the disclosure described in claim 4, the processor creates the first map based on detection values of the yaw rate sensor, the vehicle speed sensor, and the first steering angle sensor of the diagnosis target vehicle. Accordingly, the processor can update the first map based on the detection values of the yaw rate sensor, the vehicle speed sensor, and the first steering angle sensor. The latest state of the parts that affect the curvature of the diagnosis target vehicle is thus incorporated in the first map. Therefore, the reliability of the first map of the disclosure described in claim 4 is high.

In a vehicle behavior estimation method according to the disclosure described in claim 5, a processor provided in a diagnosis target vehicle acquires a first curvature that is a curvature of a traveling locus of the diagnosis target vehicle based on a yaw rate and a vehicle speed of the diagnosis target vehicle, and performs a driving diagnosis related to steering of the diagnosis target vehicle based on a criterion and a curvature-related value. The criterion defines a relationship between a steering angle-related value that is a value based on a steering angle of a steering wheel of a reference vehicle that is a vehicle different from the diagnosis target vehicle and a behavior of the reference vehicle caused by steering. The curvature-related value is a value based on the first curvature.

As described above, the vehicle behavior estimation system and the vehicle behavior estimation method according to the present disclosure have an excellent effect that a driving diagnosis related to steering of a plurality of vehicles can be executed based on one criterion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION I/F EMBODIMENTS

Figure 1:
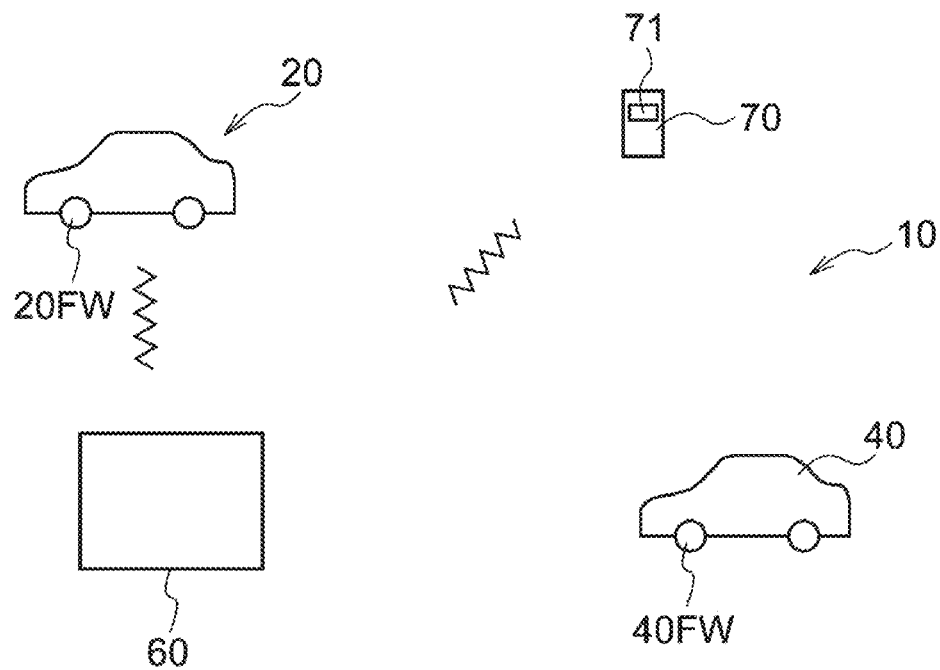
FIG. 1 is a schematic diagram showing a vehicle behavior estimation system according to a first embodiment.

Hereinafter, a first embodiment of a vehicle behavior estimation system 10 and a vehicle behavior estimation method according to the present disclosure will be described with reference to FIGS. 1 to 10. As shown in FIG. 1, the vehicle behavior estimation system 10 includes a diagnosis target vehicle 20, a reference vehicle 40, an external server 60, and a mobile terminal 70.

The vehicle behavior estimation system 10 has a plurality of diagnosis target vehicles 20. For the sake of convenience, only one diagnosis target vehicle 20 is shown in FIG. 1. The diagnosis target vehicle 20 can perform data communication with the external server 60 via a network. The network includes a communication network of a telecommunications carrier and the Internet network.

Figure 2:
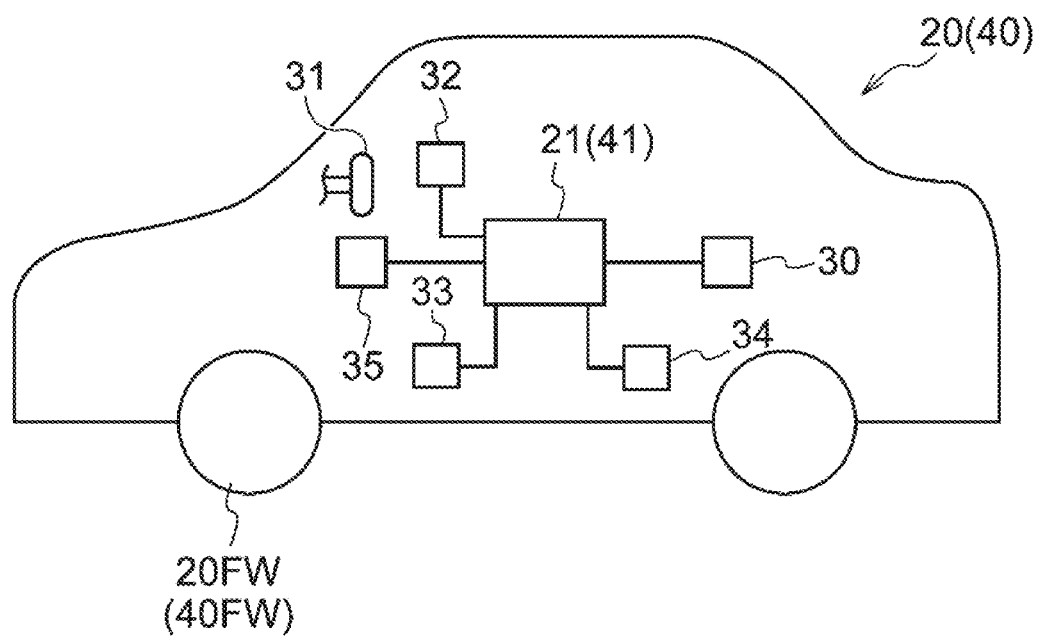
FIG. 2 is a schematic diagram showing a diagnosis target vehicle and a reference vehicle of the vehicle behavior estimation system according to the first embodiment.

As shown in FIG. 2, the diagnosis target vehicle 20 capable of receiving the diagnosis by the vehicle behavior estimation system 10 has four wheels, an electronic control unit (ECU) 21, a vehicle speed sensor 30, a steering wheel 31, a steering angle sensor 32 (first steering angle sensor), a global positioning system (GPS) receiver 33, a yaw rate sensor 34, and an ignition switch 35. A vehicle identification (ID) is assigned to each diagnosis target vehicle 20. Two front wheels 20FW are steered wheels. Thus, when the steering angle of the steering wheel 31 changes, the steered angles of the right and left steered wheels 20FW change. The vehicle speed sensor 30, the steering angle sensor 32, the GPS receiver 33, the yaw rate sensor 34, and the ignition switch 35 are connected to the ECU 21. When the ignition switch 35 is in the OFF state, the drive source of the diagnosis target vehicle 20 is inoperable, and when the ignition switch 35 is in the ON state, the drive source is operable. The drive source includes, for example, at least one of an engine and an electric motor. Therefore, the "ignition switch 35" in the present specification includes an ignition switch operated by a key and other switches. The other switches include, for example, a push-type start button.

When the ignition switch 35 is in the ON state, the vehicle speed sensor 30 acquires the vehicle speed V1 of the diagnosis target vehicle 20 and transmits the acquired vehicle speed V1 to the ECU 21 every time a predetermined time elapses. When the ignition switch 35 is in the ON state, the steering angle sensor 32 acquires the steering angle ST1 that is the rotation angle of the steering wheel 31 and transmits the acquired steering angle ST1 to the ECU 21 every time a predetermined time elapses. When the ignition switch 35 is in the ON state, the GPS receiver 33 receives the GPS signal transmitted from a GPS satellite every time a predetermined time elapses. That is, the GPS receiver 33 acquires information related to the position where the diagnosis target vehicle 20 is traveling (hereinafter referred to as "position information"). When the ignition switch 35 is in the ON state, the yaw rate sensor 34 acquires the yaw rate YR1 of the diagnosis target vehicle 20 and transmits the acquired yaw rate YR1 to the ECU 21 every time a predetermined time elapses. The detection values of the vehicle speed sensor 30, the steering angle sensor 32, and the yaw rate sensor 34 which are transmitted to the ECU 21 are recorded in a storage 25 described later in association with the ID information of the diagnosis target vehicle 20, the position information described above, and the time information.

Figure 3:
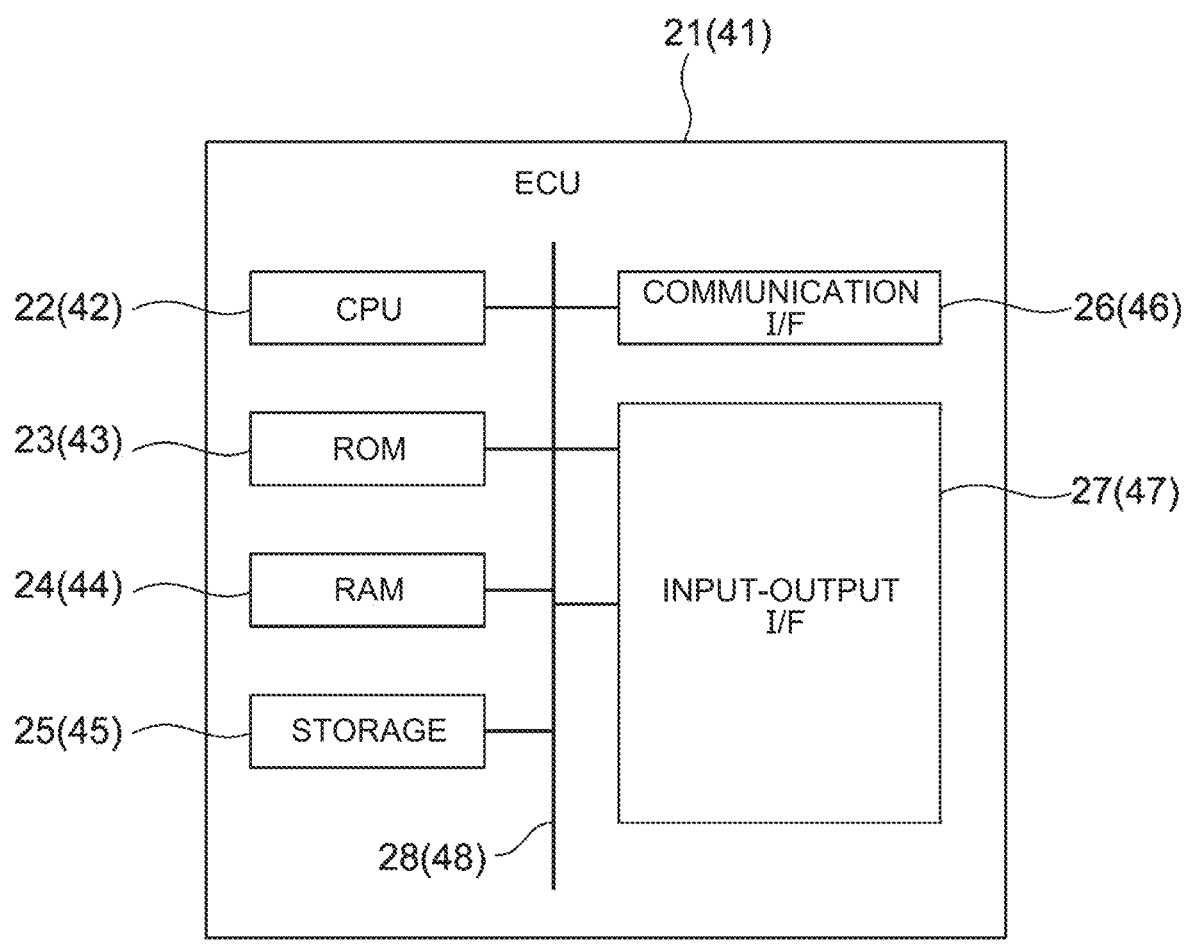
FIG. 3 is a control block diagram of an electronic control unit (ECU) of the diagnosis target vehicle and the reference vehicle.

The ECU 21 shown in FIG. 3 includes a central processing unit (CPU: processor) 22, a read-only memory (ROM) 23, a random access memory (RAM) 24, the storage 25, a communication interface (I/F) 26, and an input-output I/F 27. The CPU 22, the ROM 23, the RAM 24, the storage 25, the communication I/F 26, and the input-output I/F 27 are connected to each other so as to be able to communicate with each other via a bus 28. The ECU 21 can acquire information related to the date and time from a timer (not shown).

The CPU 22 is a central processing unit, and executes various programs and controls various units. In other words, the CPU 22 reads the program from the ROM 23 or the storage 25 and executes the program using the RAM 24 as a work area. The CPU 22 controls each configuration and executes various arithmetic processes (information processes) in accordance with the program recorded in the ROM 23 or the storage 25.

The ROM 23 stores various programs and various data. The RAM 24 temporarily stores a program or data as a work area. The storage 25 is composed of a storage device such as a hard disk drive (HDD) or a solid state drive (SSD), and stores various programs and various data. The communication I/F 26 is an interface capable of communicating with a device located outside the diagnosis target vehicle 20. For example, the communication I/F 26 can wirelessly communicate with the external server 60. Communication standards such as Bluetooth (registered trademark) and Wi-Fi (registered trademark) are used for the communication I/F 26.

Further, the communication I/F 26 can communicate with an ECU different from the ECU 21 provided in the diagnosis target vehicle 20 via an external bus.

Figure 4:
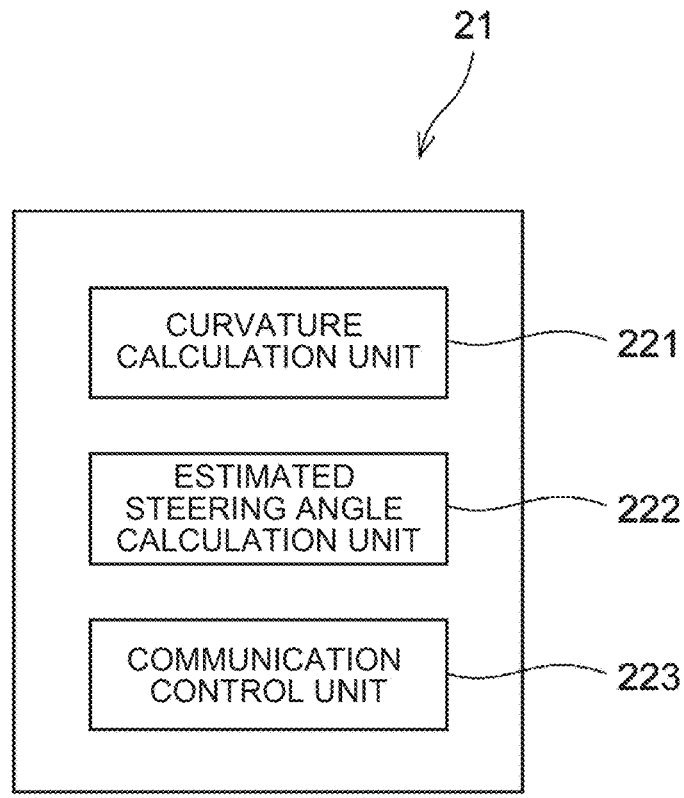
FIG. 4 is a functional block diagram of the ECU.

As shown in FIG. 4, the ECU 21 has a curvature calculation unit 221, an estimated steering angle calculation unit 222, and a communication control unit 223 as functional configurations. The curvature calculation unit 221, the estimated steering angle calculation unit 222, and the communication control unit 223 are realized as the CPU 22 of the ECU 21 reads and executes the program stored in the ROM 23.

The curvature calculation unit 221 calculates "the curvature Cv1 of the traveling locus of the diagnosis target vehicle 20=the yaw rate YR1÷the vehicle speed V1" based on the yaw rate YR1 detected by the yaw rate sensor 34 and the vehicle speed V1 detected by the vehicle speed sensor 30.

Figures 6, 7:
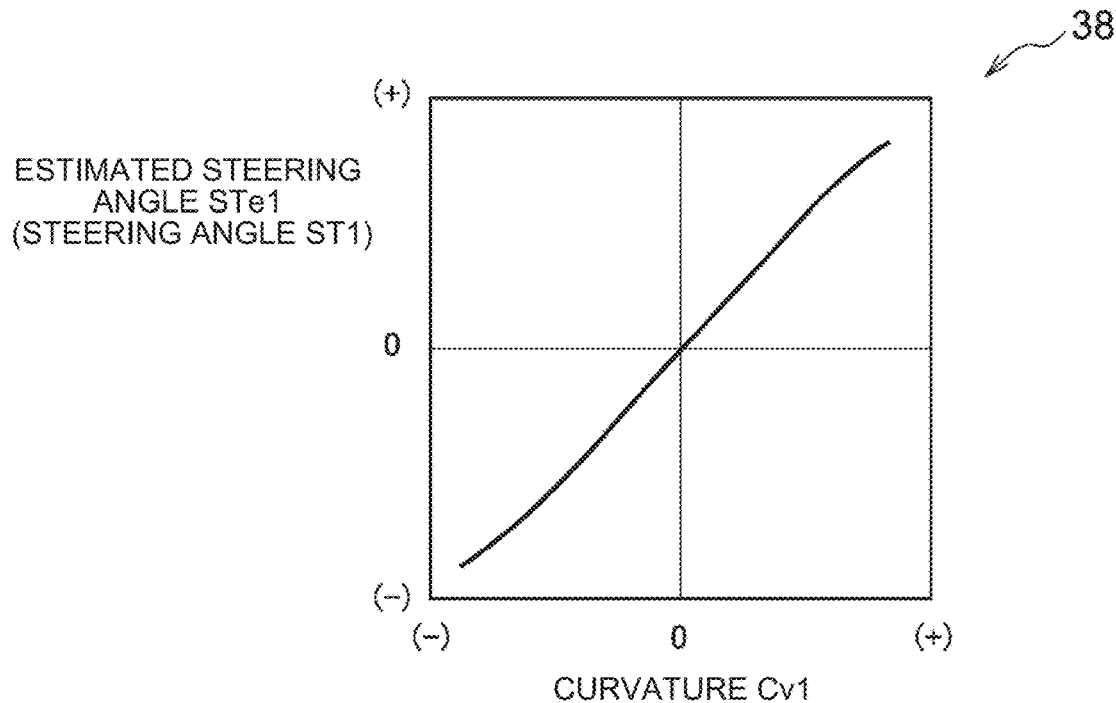
FIG. 6 is a diagram showing a conversion map recorded in a read-only memory (ROM) of the ECU of the diagnosis target vehicle.
FIG. 7 is a diagram showing a steering diagnosis map recorded in the external server.

The estimated steering angle calculation unit 222 calculates the estimated steering angle STe1 of the diagnosis target vehicle 20 based on the curvature Cv1 calculated by the curvature calculation unit 221 and a conversion map 38 shown in FIG. 6. The vertical axis of the conversion map 38 represents the steering angle ST1, and the horizontal axis represents the curvature Cv1. The sign of the steering angle ST1 when the steering wheel 31 is steered in the clockwise direction is + (plus), and the sign of the steering angle ST1 when the steering wheel 31 is steered in the counterclockwise direction is − (minus). Further, the sign of the curvature Cv1 when the diagnosis target vehicle 20 turns to the right is + (plus), and the sign of the curvature Cv1 when the diagnosis target vehicle 20 turns to the left is − (minus). The conversion map 38 is created based on a large amount of data representing the vehicle speed V1 detected by the vehicle speed sensor 30 of the traveling diagnosis target vehicle 20 and a large amount of data representing the steering angle ST1 detected by the steering angle sensor 32 of the traveling diagnosis target vehicle 20. It is known that the steering angle of the vehicle and the curvature of the traveling locus are almost proportional to each other. The line in the graph shown in the conversion map 38 is therefore substantially linear. The estimated steering angle calculation unit 222 acquires the steering angle ST1 as the estimated steering angle STe1 by applying the calculated curvature Cv1 to the conversion map 38 as an argument. Further, the estimated steering angle calculation unit 222 records the acquired estimated steering angle STe1 in the storage 25 in association with the ID information of the diagnosis target vehicle 20, the position information described above, and the time information.

The communication control unit 223 controls the communication I/F 26 so as to wirelessly transmit the vehicle speed V1, the yaw rate YR1, the curvature Cv1 and the estimated steering angle STe1 recorded in the storage 25 to the external server 60 every time a predetermined time elapses.

The vehicle behavior estimation system 10 has one reference vehicle 40. The reference vehicle 40 can perform data communication with the external server 60 via a network.

As shown in FIG. 2, the reference vehicle 40 includes four wheels including two steered wheels (front wheels) 40FW, an ECU 41, a vehicle speed sensor 30, a steering wheel 31, a steering angle sensor (second steering angle sensor) 32, a GPS receiver 33, a yaw rate sensor 34, and an ignition switch 35. A vehicle ID is assigned to the reference vehicle 40. The vehicle speed sensor 30, the steering angle sensor 32, the GPS receiver 33, the yaw rate sensor 34, and the ignition switch 35 are connected to the ECU 41. When the steering angle of the steering wheel 31 changes, the steered angle of the right and left steered wheels 40FW changes.

As shown in FIG. 3, the ECU 41 includes a CPU (processor) 42, a ROM 43, a RAM 44, a storage 45, a communication I/F 46, and an input-output I/F 47. The CPU 42, the ROM 43, the RAM 44, the storage 45, the communication I/F 46, and the input-output I/F 47 are connected to each other so as to be able to communicate with each other via a bus 48. The specifications of the CPU 42, the ROM 43, the RAM 44, the storage 45, the communication I/F 46, and the input-output I/F 47 are the same as those of each of the CPU 22, the ROM 23, the RAM 24, the storage 25, the communication I/F 26, and the input-output I/F 27.

The external server 60 shown in FIG. 1 includes a CPU (processor), a ROM, a RAM, a storage, a communication I/F, and an input-output I/F as hardware configurations. The CPU, the ROM, the RAM, the storage, the communication I/F, and the input-output I/F are connected to each other so as to be able to communicate with each other via a bus. The CPU of the external server 60 can acquire information related to the time from the timer.

Figure 5:
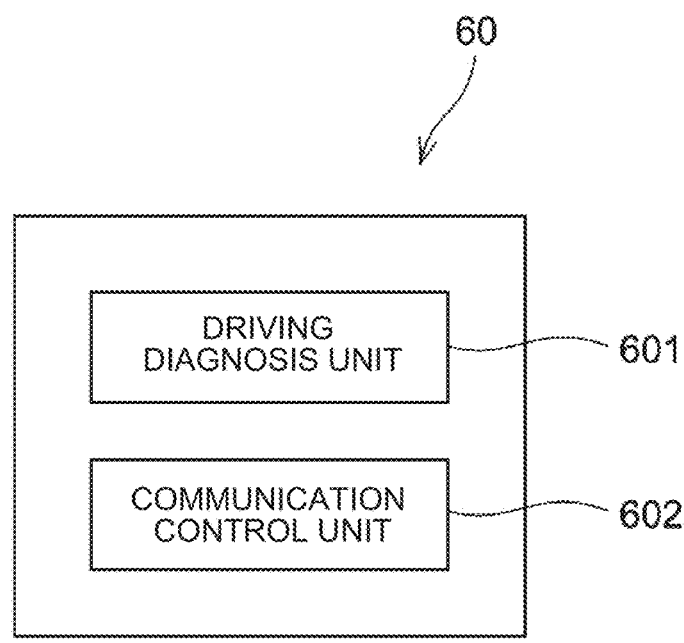
FIG. 5 is a functional block diagram of an external server of the vehicle behavior estimation system.

As shown in FIG. 5, the hardware of the external server 60 has a driving diagnosis unit 601 and a communication control unit 602 as functional configurations. The driving diagnosis unit 601 and the communication control unit 602 are realized as the CPU of the external server 60 reads and executes the program stored in the ROM or the storage.

The driving diagnosis unit 601 acquires the steering angular acceleration (curvature-related value) STa1, which is the acceleration of the estimated steering angle STe1, by subjecting the estimated steering angle STe1 received from the diagnosis target vehicle 20 to differentiation of second order. The driving diagnosis unit 601 also records the acquired steering angular acceleration STa1 in the storage of the external server 60 in association with the ID information of the diagnosis target vehicle 20, the position information described above, and the time information.

A steering diagnosis map (criterion) 65 shown in FIG. 7 is recorded in the ROM or the storage of the external server 60. The steering diagnosis map 65 defines the vehicle speed V2 of the reference vehicle 40, the steering angular acceleration STa2 (steering angle-related value) that is the second-order differentiation value of the steering angle ST2, and the score related to the steering. The vehicle speed V2 is a detection value of the vehicle speed sensor 30 of the reference vehicle 40. The steering angle ST2 is a detection value of the steering angle sensor 32 of the reference vehicle 40. The score is defined based on the behavior caused by the steering of the reference vehicle 40. That is, the steering diagnosis map 65 defines the relationship between the steering angular acceleration of the reference vehicle 40 and the behavior caused by the steering of the reference vehicle 40 for each vehicle speed. Therefore, by applying the steering angular acceleration STa2 to the steering diagnosis map 65, it is possible to obtain the score representing the behavior caused by the steering of the reference vehicle 40.

The steering diagnosis map 65 of the first embodiment defines the vehicle speed V2 by dividing it into three regions. These three regions are a region of less than A (km/h), a region of A or more and less than B (km/h), and a region of B or more. The magnitude relationship is represented by B>A and A and B are positive values. As shown in the steering diagnosis map 65, in the case where the vehicle speed V2 is less than A, the score when the steering angular acceleration STa2 is less than X1 is 10 points, and the score when the steering angular acceleration STa2 is X1 or more is 1 point. In the case where the vehicle speed V2 is A or more and less than B, the score when the steering angular acceleration STa2 is less than X2 is 10 points, and the score when the steering angular acceleration STa2 is X2 or more is 1 point. In the case where the vehicle speed V2 is B or more, the score when the steering angular acceleration STa2 is less than X3 is 10 points, and the score when the steering angular acceleration STa2 is X3 or more is 1 point. It should be noted that the magnitude relationship is represented by X1<X2<X3. X1, X2, and X3 are absolute values. By applying the vehicle speed V1 and the steering angular acceleration STa1 to the steering diagnosis map 65, the driving diagnosis unit 601 acquires the score related to the steering of each diagnosis target vehicle 20. For example, when the vehicle speed V1 is less than A and the steering angular acceleration STa1 is less than X1, the score is 10 points. The driving diagnosis unit 601 also records the acquired score in the storage of the external server 60 in association with the ID information of the diagnosis target vehicle 20, the position information, and the time information.

The communication control unit 602 controls the communication I/F of the external server 60 so as to wirelessly transmit information related to the score of the diagnosis target vehicle 20, which is recorded in the storage and associated with the position information described above and the time information, to the mobile terminal 70 carried by an occupant of the diagnosis target vehicle 20 to which the score is given.

The mobile terminal 70 shown in FIG. 1 includes a CPU, a ROM, a RAM, a storage, a communication I/F, and an input-output I/F as hardware configurations. The mobile terminal 70 is, for example, a smartphone or a tablet computer. The CPU, the ROM, the RAM, the storage, the communication I/F, and the input-output I/F of the mobile terminal 70 are connected to each other so as to be able to communicate with each other via a bus. The communication I/F of the mobile terminal 70 can wirelessly communicate with the communication I/F of the external server 60. The mobile terminal 70 can acquire information related to the date and time from a timer (not shown). The mobile terminal 70 is provided with a display 71 having a touch panel. Further, map data is recorded in the storage of the mobile terminal 70. The mobile terminal 70 is carried by, for example, the driver of the diagnosis target vehicle 20. A predetermined driving diagnosis display application is installed on the mobile terminal 70.

Operation and Effects

Next, the operation and effects of the first embodiment will be described.

First, the flow of a process performed by the ECU 21 of each diagnosis target vehicle 20 will be described with reference to a flowchart shown in FIG. 8. The ECU 21 repeatedly executes the process of the flowchart shown in FIG. 8 every time a predetermined time elapses.

First, in step S10, the curvature calculation unit 221 of the ECU 21 calculates the curvature Cv1 based on the yaw rate YR1 detected by the yaw rate sensor 34 and the vehicle speed V1 detected by the vehicle speed sensor 30.

The ECU 21 that has completed the process of step S10 proceeds to step S11. In step S11, the estimated steering angle calculation unit 222 of the ECU 21 acquires the estimated steering angle STe1 by applying the curvature Cv1 to the conversion map 38 as an argument.

The ECU 21 that has completed the process of step S11 proceeds to step S12. In step S12, the communication control unit 223 of the ECU 21 controls the communication I/F 26 so as to wirelessly transmit the vehicle speed V1, the yaw rate YR1, the curvature Cv1, and the estimated steering angle STe1 recorded in the storage 25 and associated with the position information and the time information to the external server 60.

Figure 8:
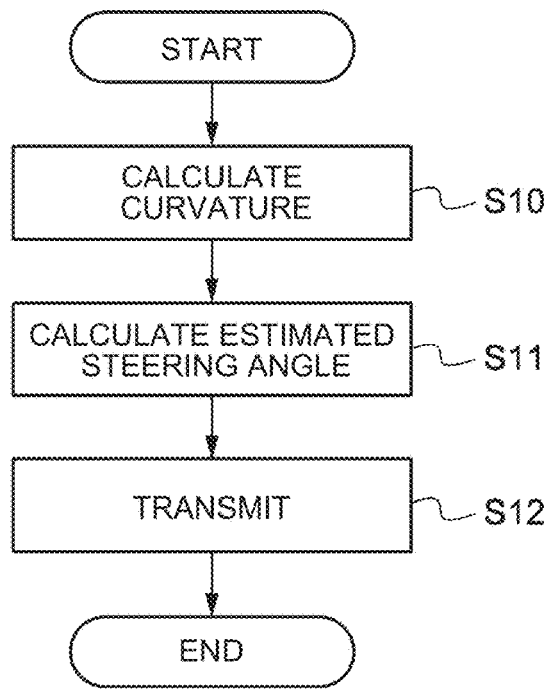
FIG. 8 is a flowchart showing a process executed by the ECU of the diagnosis target vehicle.

When the process of step S12 is completed, the ECU 21 temporarily ends the process of the flowchart shown in FIG. 8.

Next, the flow of the process executed by the external server 60 will be described with reference to the flowchart shown in FIG. 9. The external server 60 repeatedly executes the process of the flowchart shown in FIG. 9 every time a predetermined time elapses.

First, in step S20, the communication control unit 602 of the external server 60 determines whether the communication I/F has received the vehicle speed V1, the yaw rate YR1, the curvature Cv1, and the estimated steering angle STe1 from the diagnosis target vehicle 20.

The external server 60 that has determined Yes in step S20 proceeds to step S21, and the driving diagnosis unit 601 calculates the steering angular acceleration STa1 that is the acceleration of the estimated steering angle STe1. Further, the driving diagnosis unit 601 acquires the score related to the steering of the diagnosis target vehicle 20 by applying the vehicle speed V1 and the steering angular acceleration STa1 to the steering diagnosis map 65. The driving diagnosis unit 601 also records the acquired score in the storage of the external server 60 in association with the ID information of the diagnosis target vehicle 20, the position information, and the time information.

The external server 60 that has completed the process of step S21 proceeds to step S22. In step S22, the communication control unit 602 of the external server 60 controls the communication I/F 46 so as to wirelessly transmit the information related to the score recorded in the storage and associated with the position information and the time information to the mobile terminal 70.

Figure 9:
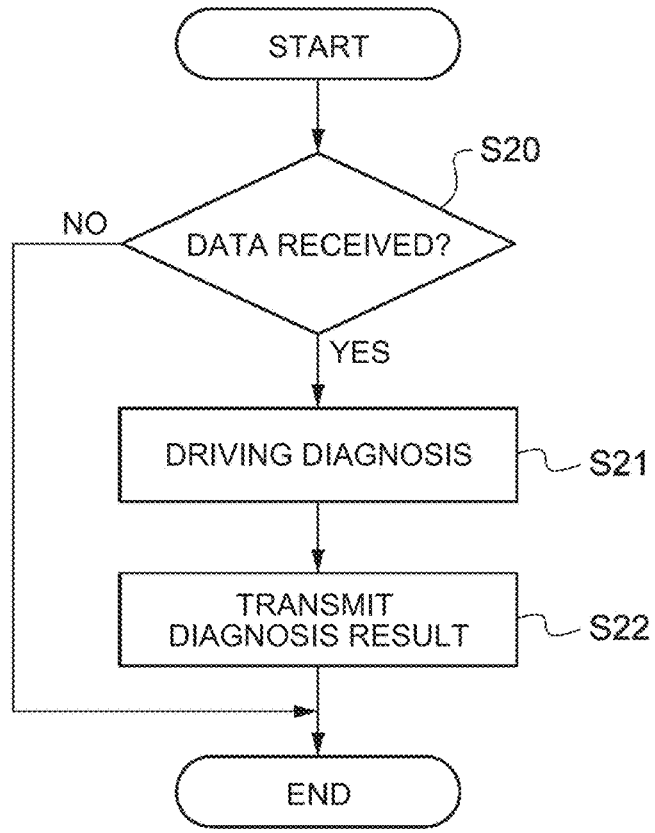
FIG. 9 is a flowchart showing a process executed by the external server.

When the determination is No in step S20 or when the process in step S22 is completed, the external server 60 temporarily ends the process of the flowchart shown in FIG. 9.

Next, the flow of the process executed by the mobile terminal 70 will be described with reference to a flowchart shown in FIG. 10. The mobile terminal 70 repeatedly executes the process of the flowchart shown in FIG. 10 every time a predetermined time elapses.

In step S30, the CPU of the mobile terminal 70 determines whether the driving diagnosis display application is running.

The mobile terminal 70 that has determined Yes in step S30 proceeds to step S31, and determines whether the communication I/F of the mobile terminal 70 has received the score information related to the diagnosis target vehicle 20 on which the person who carries the mobile terminal 70 rides from the communication I/F of the external server 60.

The mobile terminal 70 that has determined Yes in step S31 proceeds to step S32, and the CPU causes the display 71 to display an image showing the score (not shown). At this time, the display 71 may display a map image represented by the map data recorded in the storage of the mobile terminal 70, and may display the position where the steering operation corresponding to the score was performed as a specific image superimposed on the map image. Further, the display 71 may display information indicating the time when the steering operation corresponding to the score was performed in association with the score.

Figure 10:
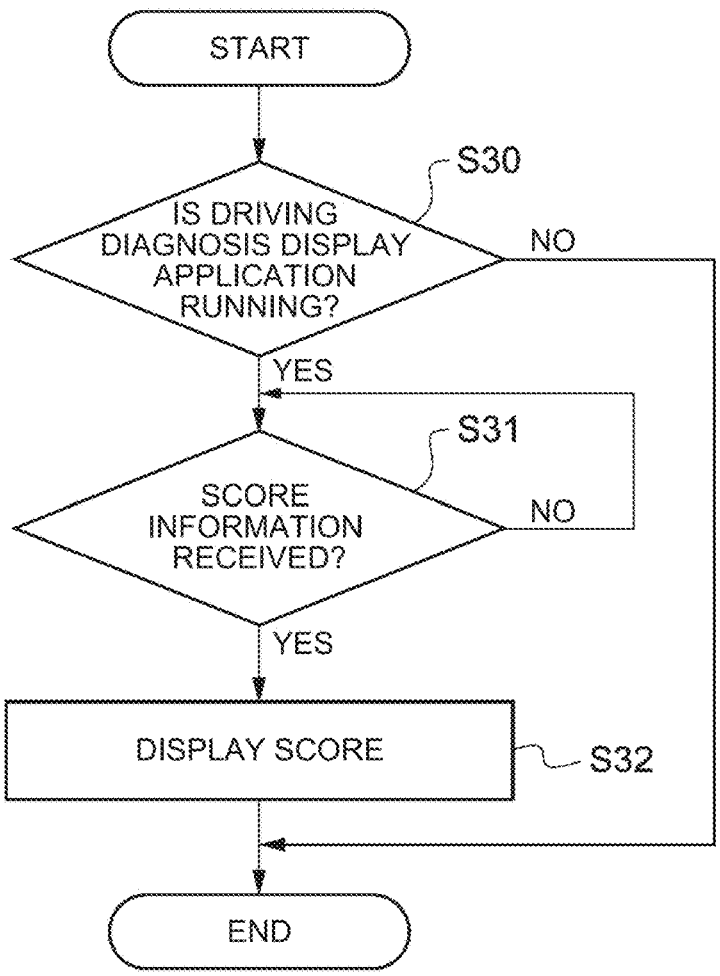
FIG. 10 is a flowchart showing a process executed by a mobile terminal.

When the determination is NO in step S30 or when the process of step S32 is completed, the mobile terminal 70 temporarily ends the process of the flowchart shown in FIG. 10.

As described above, in the vehicle behavior estimation system 10 and the vehicle behavior estimation method of the first embodiment, the curvature Cv1 of the traveling locus of the diagnosis target vehicle 20 is obtained based on the yaw rate YR1 and the vehicle speed V1 of the diagnosis target vehicle 20. Further, a driving diagnosis related to the steering of the diagnosis target vehicle 20 is performed based on the steering angular acceleration STa1 (curvature-related value) that is a value based on the steering diagnosis map 65 and the curvature Cv1. As described above, the steering diagnosis map 65 defines the relationship between the steering angular acceleration of the reference vehicle 40 and the behavior of the reference vehicle 40. In other words, the steering diagnosis map 65 does not define the relationship between the steering angular acceleration STa1 of the diagnosis target vehicle 20 and the behavior of the diagnosis target vehicle 20. However, it is known that the relationship between the curvature of the traveling locus and the behavior caused by the steering of the vehicle is substantially the same regardless of the vehicle type (specification) of the vehicle. Further, as described above, the steering angle of the vehicle can be obtained from the curvature of the traveling locus. Accordingly, the score obtained by applying the steering angular acceleration STa1 that is a value based on the curvature Cv1 of the diagnosis target vehicle 20 to the steering diagnosis map 65 represents the behavior caused by the steering of the diagnosis target vehicle 20. Therefore, the vehicle behavior estimation system 10 and the vehicle behavior estimation method of the first embodiment can execute the driving diagnosis related to the steering of the diagnosis target vehicle 20 based on the steering diagnosis map 65 (criterion) and the steering angular acceleration STa1 (curvature-related value) of the diagnosis target vehicle 20. Further, by applying the steering angular acceleration STa2 to the steering diagnosis map 65, it is possible to execute the driving diagnosis related to the steering of the reference vehicle 40. That is, the vehicle behavior estimation system 10 and the vehicle behavior estimation method of the first embodiment can execute the driving diagnosis related to the steering of the reference vehicle 40 and the diagnosis target vehicle 20 based on one criterion.

Next, a second embodiment of the vehicle behavior estimation system 10 and the vehicle behavior estimation method according to the present disclosure will be described with reference to FIGS. 11 to 17. The same configurations and functions as those in the first embodiment are designated by the same reference signs, and detailed description thereof will be omitted.

Figure 11:
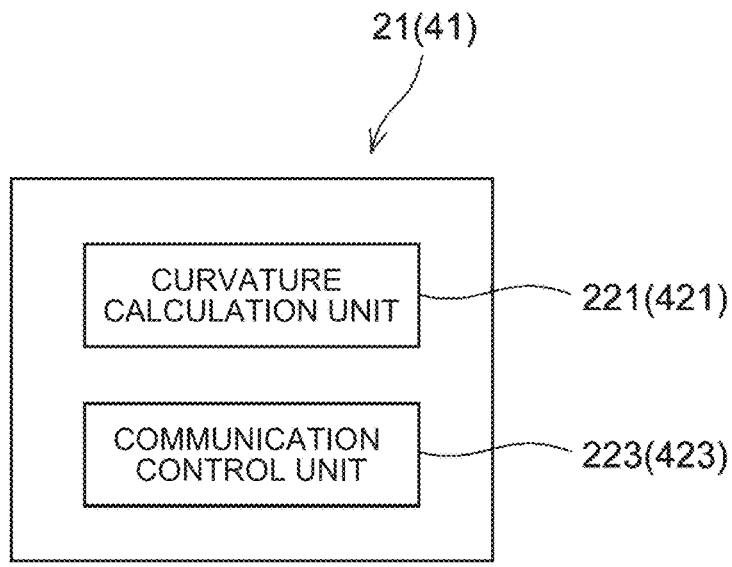
FIG. 11 is a functional block diagram of an ECU of a diagnosis target vehicle and a reference vehicle according to a second embodiment.

As shown in FIG. 11, the ECU 21 of each diagnosis target vehicle 20 of the second embodiment has the curvature calculation unit 221 and the communication control unit 223 as functional configurations. Further, the ECU 41 of the reference vehicle 40 of the second embodiment has a curvature calculation unit 421 and a communication control unit 423 as functional configurations. The functions of the curvature calculation unit 421 and the communication control unit 423 are the same as the functions of each of the curvature calculation unit 221 and the communication control unit 223. The curvature calculation unit 421 and the communication control unit 423 are realized as the CPU 42 of the ECU 41 reads and executes the program stored in the ROM 43.

The curvature calculation unit 221 calculates the curvature Cv1 based on the yaw rate YR1 detected by the yaw rate sensor 34 of the diagnosis target vehicle 20 and the vehicle speed V1 detected by the vehicle speed sensor 30 of the diagnosis target vehicle 20, and records the calculated curvature Cv1 in the storage 25 in association with the ID information of the diagnosis target vehicle 20, the position information, and the time information.

The communication control unit 223 controls the communication I/F 26 so as to wirelessly transmit the vehicle speed V1, the steering angle ST1, the yaw rate YR1, and the curvature Cv1 recorded in the storage 25 and associated with the position information described above and the time information to the external server 60 every time a predetermined time elapses.

The curvature calculation unit 421 calculates "the curvature Cv2 of the traveling locus of the reference vehicle 40=the yaw rate YR2÷the vehicle speed V2" based on the yaw rate YR2 detected by the yaw rate sensor 34 of the reference vehicle 40 and the vehicle speed V2 detected by the vehicle speed sensor 30 of the reference vehicle 40.

The communication control unit 423 controls the communication I/F 46 so as to wirelessly transmit the vehicle speed V2, the steering angle ST2, the yaw rate YR2, and the curvature Cv2 recorded in the storage 45 and associated with the position information described above and the time information to the external server 60 every time a predetermined time elapses.

Figure 12:
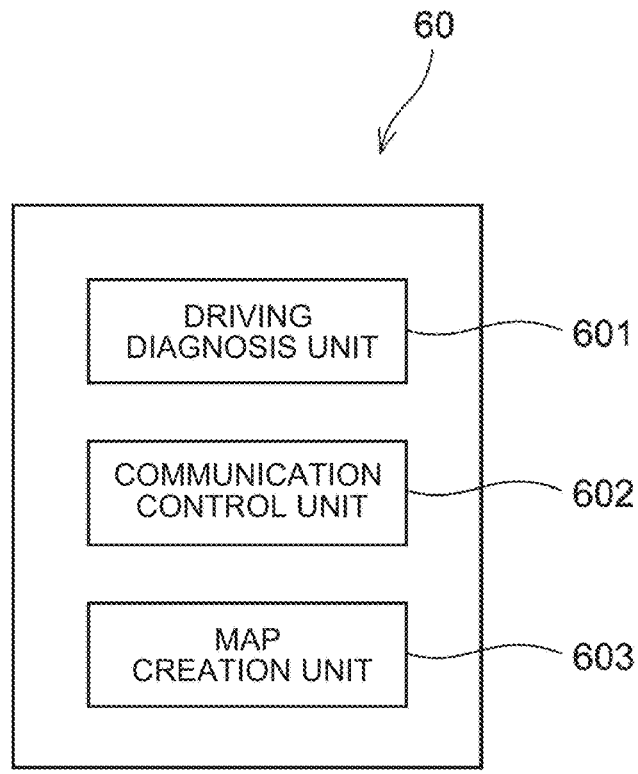
FIG. 12 is a functional block diagram of an external server according to the second embodiment.

As shown in FIG. 12, the hardware of the external server 60 of the second embodiment has a driving diagnosis unit 601, a communication control unit 602, and a map creation unit 603 as functional configurations.

Figure 13:
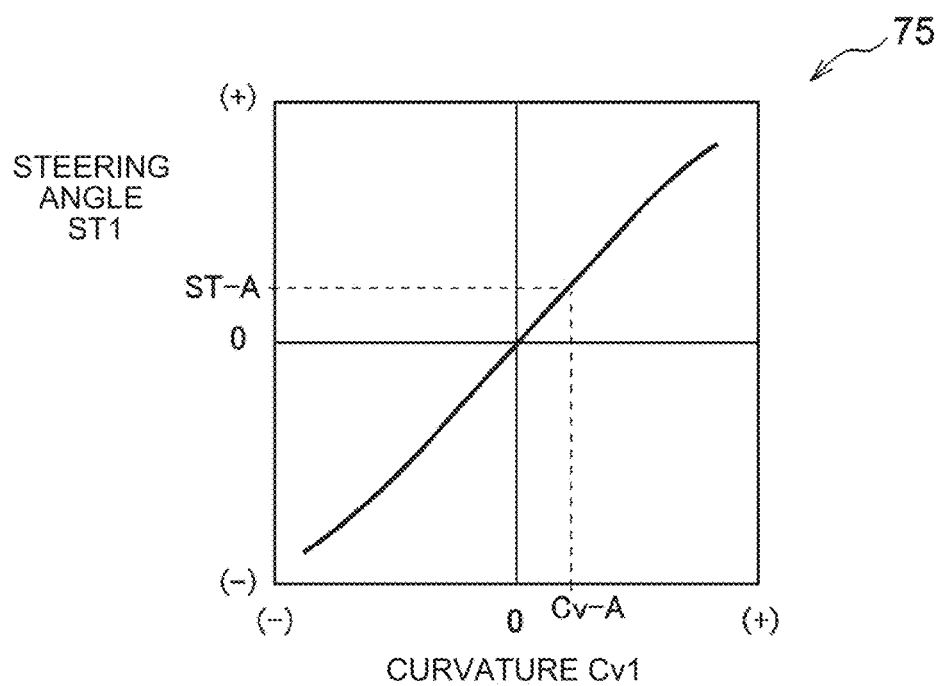
FIG. 13 is a diagram showing a first map according to the second embodiment.
Figure 15:
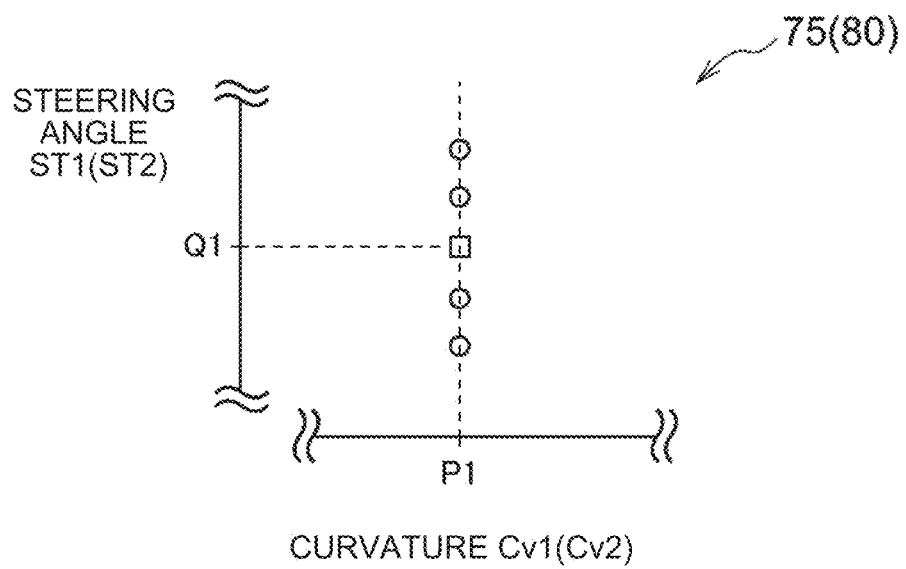
FIG. 15 is a diagram illustrating a method of creating the first map and the second map according to the second embodiment.

The map creation unit 603 creates a first map 75 shown in FIG. 13 based on the steering angle ST1 and the curvature Cv1 received from each diagnosis target vehicle 20. The vertical axis of the first map 75 represents the steering angle ST1, and the horizontal axis represents the curvature Cv1. The external server 60 receives a large amount of data representing the steering angle ST1 and the curvature Cv1 from each diagnosis target vehicle 20. The map creation unit 603 plots the received data representing all the steering angles ST1 and the curvatures Cv1 on the first map 75. The map creation unit 603 then creates the first map 75 based on all the plotted data. At this time, the map creation unit 603 averages the data. That is, for example, as shown in FIG. 15, it is assumed that the steering angle ST1 corresponding to P1 that is a predetermined value of the curvature Cv1 includes four steering angles ST1 represented by circles. In this case, the map creation unit 603 regards the average value of the four steering angles ST1 represented by a square as the value Q1 of the steering angle ST1 corresponding to P1.

Figure 14:
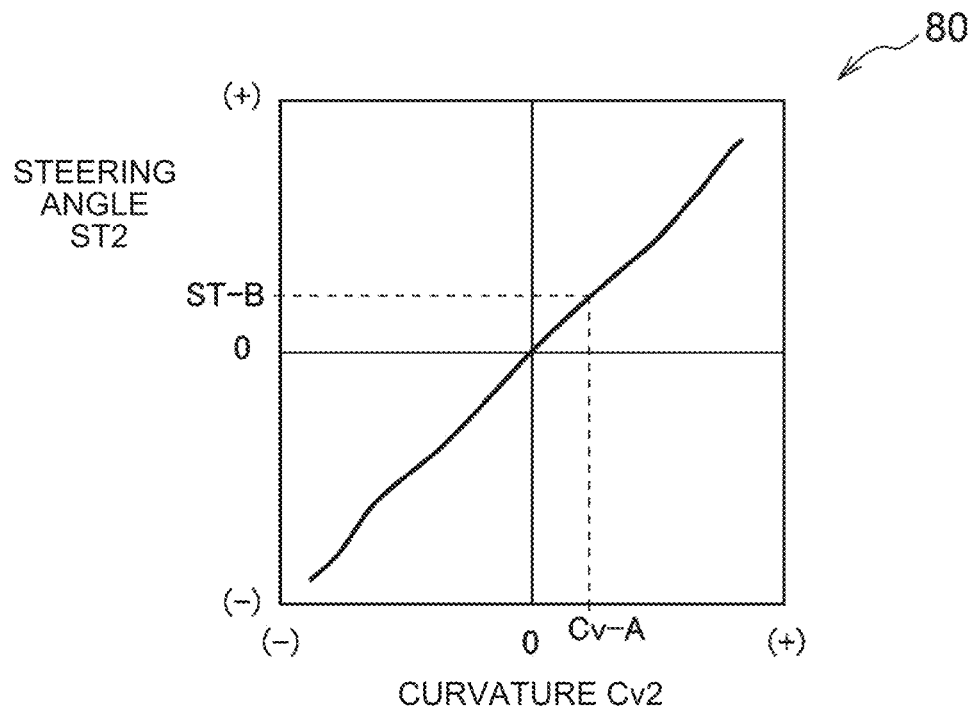
FIG. 14 is a diagram showing a second map according to the second embodiment.

Further, in the same manner, the map creation unit 603 creates a second map 80 shown in FIG. 14 based on the steering angle ST2 and the curvature Cv2 received from the reference vehicle 40. Generally, the detection accuracy of the yaw rate sensor 34 is not high. However, the first map 75 and the second map 80 created in this way more accurately represents the relationship between the steering angle and the curvature of the diagnosis target vehicle 20 and the reference vehicle 40 as compared with the first map 75 and the second map 80 created not based on the average value. Therefore, the reliability of the first map 75 and the second map 80 created in this way is high.

Operation and Effects

Next, the operation and effects of the second embodiment will be described.

First, the flow of a process performed by the ECU 21 of each diagnosis target vehicle 20 and the ECU 41 of the reference vehicle 40 will be described with reference to a flowchart shown in FIG. 16. The ECUs 21, 41 repeatedly execute the process of the flowchart shown in FIG. 16 every time a predetermined time elapses.

First, in step S10, the curvature calculation units 221, 421 of the ECUs 21, 41 calculate the curvatures Cv1, Cv2.

The ECUs 21, 41 that have completed the process of step S10 proceed to step S12. In step S12, the communication control unit 223 of the ECU 21 controls the communication I/F 26 so as to wirelessly transmit the vehicle speed V1, the steering angle ST1, the yaw rate YR1, and the curvature Cv1 associated with the ID information, the position information, and the time information to the external server 60. In step S12, the communication control unit 423 of the ECU 41 controls the communication I/F 46 so as to wirelessly transmit the vehicle speed V2, the steering angle ST2, the yaw rate YR2, and the curvature Cv2 associated with the ID information, the position information, and the time information to the external server 60.

Figure 16:
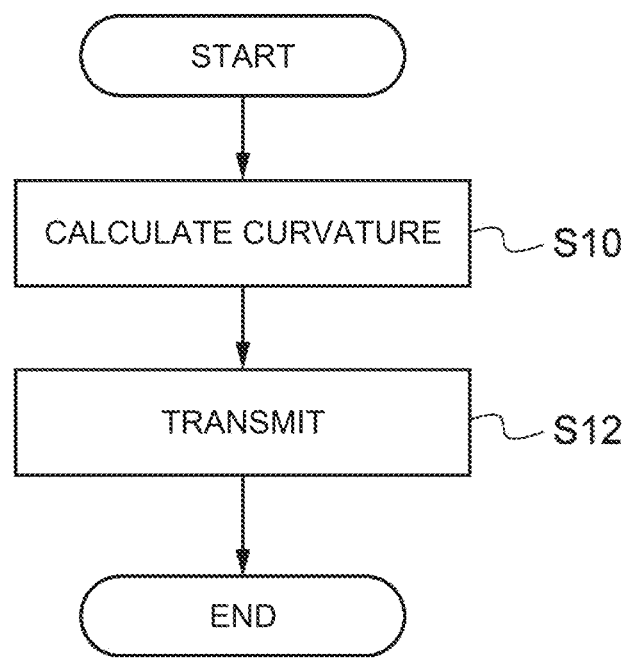
FIG. 16 is a flowchart showing a process executed by the ECU of the diagnosis target vehicle and the reference vehicle according to the second embodiment.

When the process of step S12 is completed, the ECUs 21, 41 temporarily end the process of the flowchart shown in FIG. 16.

Next, the flow of the process executed by the external server 60 will be described with reference to the flowchart shown in FIG. 17. The external server 60 repeatedly executes the process of the flowchart shown in FIG. 17 every time a predetermined time elapses.

First, in step S40, the communication control unit 602 of the external server 60 determines whether the communication I/F has received the vehicle speed V1, the steering angle ST1, the yaw rate YR1, and the curvature Cv1 from the diagnosis target vehicle 20, or whether the communication I/F has received the vehicle speed V2, the steering angle ST2, the yaw rate YR2, and the curvature Cv2 from the reference vehicle 40.

The external server 60 that has determined Yes in step S40 proceeds to step S41, and the map creation unit 603 creates (updates) the first map 75 based on the steering angle ST1 and the curvature Cv1 that were received.

The external server 60 that has completed the process of step S41 proceeds to step S42. In step S42, the map creation unit 603 determines whether the first map 75 satisfies the usable condition. That is, the map creation unit 603 determines whether the number of the steering angles ST1 and the curvatures Cv1 constituting the first map 75 is equal to or greater than a predetermined number and the steering angles ST1 and the curvatures Cv1 constituting the first map 75 include values having absolute values of various magnitudes.

The external server 60 that has determined Yes in step S42 proceeds to step S43, and the map creation unit 603 sets the first map flag to "1". The initial value of the first map flag is "0".

The external server 60 that has determined No in step S42 proceeds to step S44, and the map creation unit 603 sets the first map flag to "0".

The external server 60 that has completed the process of step S43 or step S44 proceeds to step S47, and the map creation unit 603 creates (updates) the second map 80 based on the steering angle ST2 and the curvature Cv2 that have been received.

The external server 60 that has completed the process of step S47 proceeds to step S48. In step S48, the map creation unit 603 of the external server 60 determines whether the second map 80 satisfies the usable condition. That is, the map creation unit 603 determines whether the number of the steering angles ST2 and the curvatures Cv2 constituting the second map 80 is equal to or greater than a predetermined number and the steering angles ST2 and the curvatures Cv2 constituting the second map 80 include values having absolute values of various magnitudes.

The external server 60 that has determined Yes in step S48 proceeds to step S49, and the map creation unit 603 sets the second map flag to "1". The initial value of the second map flag is "0".

The external server 60 that has determined No in step S48 proceeds to step S50, and the map creation unit 603 sets the second map flag to "0".

The external server 60 that has completed the process of step S49 or step S50 proceeds to step S53, and the map creation unit 603 determines whether the first map flag and the second map flag are "1".

The external server 60 that has determined Yes in step S53 proceeds to step S54 and calculates the corrected steering angle Stc1 of the diagnosis target vehicle 20 using the first map 75 and the second map 80. More specifically, the map creation unit 603 acquires the curvature Cv1 corresponding to the steering angle ST1 by applying the steering angle ST1 of the diagnosis target vehicle 20 to the first map 75 as an argument. At this time, the map creation unit 603 executes the interpolation process of the first map 75 as necessary. For example, it is assumed that the magnitude of the steering angle ST1 is the steering angle ST-A shown in FIG. 13. The magnitude of the curvature Cv1 acquired by applying the steering angle ST-A to the first map 75 as an argument is the curvature Cv-A. Further, the map creation unit 603 acquires the steering angle ST-B, which is the steering angle ST2 of the reference vehicle 40 corresponding to the curvature Cv-A, by applying the curvature Cv-A to the second map 80 as an argument. At this time, the map creation unit 603 executes the interpolation process of the second map 80 as necessary. The steering angle ST-B is the corrected steering angle Stc1 of the diagnosis target vehicle 20.

The external server 60 that has completed the process of step S54 proceeds to step S55, and the driving diagnosis unit 601 calculates the steering angular acceleration (curvature-related value) (corrected curvature-related value) STca1 that is the acceleration of the corrected steering angle Stc1. Further, the driving diagnosis unit 601 acquires the score related to the steering of the diagnosis target vehicle 20 by applying the vehicle speed V1 and the steering angular acceleration STca1 to the steering diagnosis map 65. The driving diagnosis unit 601 also records the acquired score in the storage of the external server 60 in association with the ID information of the diagnosis target vehicle 20, the position information, and the time information.

The external server 60 that has completed the process of step S55 proceeds to step S56. In step S56, the communication control unit 602 of the external server 60 controls the communication I/F 46 so as to wirelessly transmit the information related to the score recorded in the storage and associated with the ID information, the position information, and the time information to the mobile terminal 70.

Figure 17:
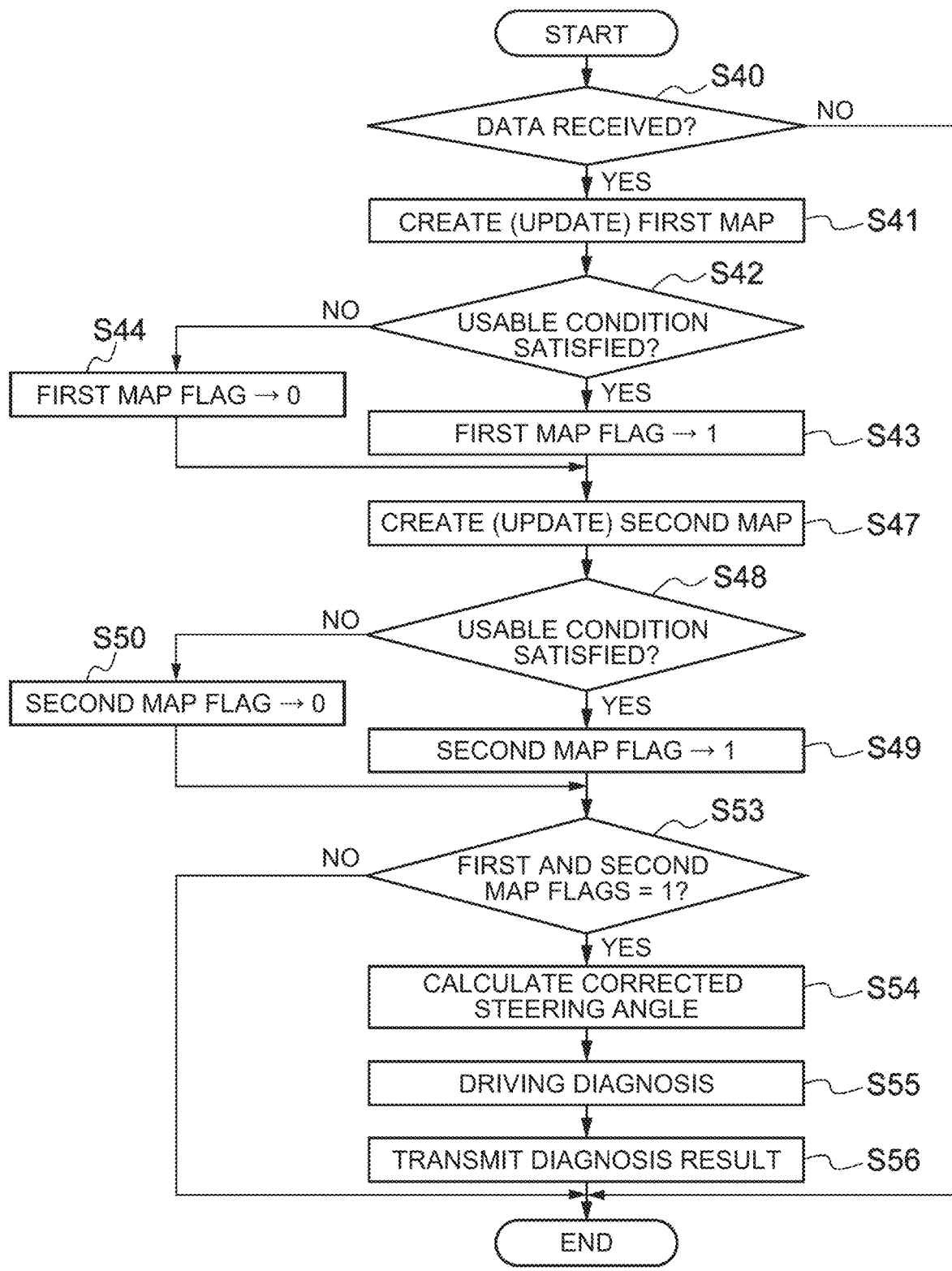
FIG. 17 is a flowchart showing a process executed by the external server according to the second embodiment.

When the determination is No in steps S40, S53 or when the process in step S56 is completed, the external server 60 temporarily ends the process of the flowchart shown in FIG. 17.

Further, the mobile terminal 70 repeatedly executes the process of the flowchart shown in FIG. 10 every time a predetermined time elapses. Thus, when the CPU of the mobile terminal 70 proceeds to step S32, the CPU causes the display 71 to display an image showing the score (not shown).

As described above, the external server 60 of the vehicle behavior estimation system 10 and the vehicle behavior estimation method of the second embodiment acquires the curvature (curvature Cv-A) by applying the detection value (steering angle ST-A) of the steering angle sensor 32 of the diagnosis target vehicle 20 to the first map 75 as an argument. Further, the external server 60 acquires the corrected steering angle STc1, which is the corrected value of the steering angle of the steering wheel 31 of the diagnosis target vehicle 20, by applying the curvature Cv-A to the second map 80 as an argument. The external server 60 also performs a driving diagnosis related to the steering of the diagnosis target vehicle 20 based on the steering angular acceleration STca1, which is the second-order differentiation value of the corrected steering angle STc1, and the steering diagnosis map 65. As shown in the first map 75 and the second map 80, there is a correlation between the steering angle ST1 and the curvature Cv1 of the diagnosis target vehicle 20, and between the steering angle ST2 and the curvature Cv2 of the reference vehicle 40. The steering angle ST-A of the diagnosis target vehicle 20 and the steering angle ST-B of the reference vehicle 40 are values corresponding to the common curvature Cv-A. That is, the behavior of the diagnosis target vehicle 20 when the steering angle of the diagnosis target vehicle 20 is the steering angle ST-A is substantially the same as the behavior of the reference vehicle 40 when the steering angle of the reference vehicle 40 is the steering angle ST-B. Accordingly, the score obtained by applying the steering angular acceleration STca1 of the diagnosis target vehicle 20 to the steering diagnosis map 65 accurately represents the behavior of the diagnosis target vehicle 20. Therefore, the vehicle behavior estimation system 10 and the vehicle behavior estimation method of the second embodiment can execute the driving diagnosis related to the steering of the diagnosis target vehicle 20 based on the steering diagnosis map 65 (criterion) and the steering angle ST1 of the diagnosis target vehicle 20.

Further, the detection accuracy of the steering angle sensor is generally higher than the detection accuracy of the yaw rate sensor. Accordingly, the steering angular acceleration STca1 of the second embodiment is more likely to represent the acceleration of the steering angle of the diagnosis target vehicle 20 more accurately than the steering angular acceleration STa1 of the first embodiment. Therefore, the driving diagnosis result of the diagnosis target vehicle 20 of the second embodiment is more reliable than the driving diagnosis result of the diagnosis target vehicle 20 of the first embodiment.

Further, the external server 60 creates the first map 75 based on the steering angle ST1 and the curvature Cv1 of the diagnosis target vehicle 20, and creates the second map 80 based on the steering angle ST2 and the curvature Cv2 of the reference vehicle 40. Therefore, the external server 60 can easily create the first map 75 and the second map 80.

Further, the external server 60 updates the first map 75 and the second map 80 based on the latest data received from the diagnosis target vehicle 20 and the reference vehicle 40. Thus, the latest state of the parts affecting the curvature Cv1 of the diagnosis target vehicle 20 is incorporated in the first map 75, and the latest state of the parts affecting the curvature Cv2 of the reference vehicle 40 is incorporated in the second map 80. These parts include, for example, tires. Therefore, the reliability of the first map 75 and the second map 80 of the second embodiment is high.

The vehicle behavior estimation system 10 and the vehicle behavior estimation method according to the first and second embodiments have been described above, but the design of the vehicle behavior estimation system 10 and the vehicle behavior estimation method can be appropriately changed within a range that does not deviate from the gist of the present disclosure.

For example, the steering diagnosis map 65 of the first embodiment may be a map defining the relationship between the second-order differentiation value (steering angle-related value) of the curvature Cv2 of the reference vehicle 40 and the behavior caused by the steering for each vehicle speed. In this case, the external server 60 calculates the score related to the driving operation of the diagnosis target vehicle 20 by applying the second-order differentiation value (curvature-related value) of the curvature Cv1 of the diagnosis target vehicle 20 to the steering diagnosis map 65.

The steering diagnosis map 65 of the second embodiment may be a map defining the relationship between the second-order differentiation value of the curvature Cv2 of the reference vehicle 40 and the behavior caused by the steering for each vehicle speed. In this case, the external server 60 calculates the score related to the driving operation of the diagnosis target vehicle 20 by applying the second-order differentiation value (curvature-related value) of the curvature Cv1 of the diagnosis target vehicle 20 acquired based on the first map 75 and the steering angle ST1 to the steering diagnosis map 65.

The vehicle behavior estimation system 10 of the first and second embodiments does not have to be connected to the Internet. In this case, for example, the detection value data group acquired from the diagnosis target vehicle 20 and the reference vehicle 40 is recorded on a portable recording medium (for example, a universal serial bus (USB)), and the detection value data group in the recording medium is copied and stored in the storage of the external server 60.

The external server 60 of the first and second embodiments may wirelessly transmit the diagnosis result to the diagnosis target vehicle 20, and the display (not shown) provided on the diagnosis target vehicle 20 may display the diagnosis result.

The ECU 21 of the diagnosis target vehicle 20 of the first and second embodiments may have the function of the external server 60. In this case, the external server 60 can be omitted from the vehicle behavior estimation system 10.

The external server 60 of the first and second embodiments may have functions corresponding to the curvature calculation unit 221 and the estimated steering angle calculation unit 222, and may calculate the curvature of the traveling locus of the diagnosis target vehicle 20 and the estimated steering angle based on information wirelessly transmitted from the diagnosis target vehicle 20.

The content of the created second map 80 does not have to be updated after it is created.

Instead of the GPS receiver 33, the diagnosis target vehicle 20 and the reference vehicle 40 may include a receiver capable of receiving information from satellites of a global navigation satellite system (for example, Galileo) other than the GPS.

What is claimed is:

1. A vehicle behavior estimation system comprising:
a yaw rate sensor that detects a yaw rate of a diagnosis target vehicle;
a vehicle speed sensor that detects a vehicle speed of the diagnosis target vehicle; and
a processor, wherein the processor
acquires a first curvature that is a curvature of a traveling locus of the diagnosis target vehicle based on the yaw rate and the vehicle speed, and
performs a driving diagnosis related to steering of the diagnosis target vehicle based on a criterion and a curvature-related value, the criterion being a criterion that defines a relationship between a steering angle-related value that is a value based on a steering angle of a steering wheel of a reference vehicle that is a vehicle different from the diagnosis target vehicle and a behavior of the reference vehicle caused by steering, and the curvature-related value being a value based on the first curvature.

2. The vehicle behavior estimation system according to claim 1, further comprising:
a first map showing a relationship between a detection value of a first steering angle sensor that is a steering angle sensor of the diagnosis target vehicle and the first curvature; and
a second map showing a relationship between a detection value of a second steering angle sensor that is a steering angle sensor of the reference vehicle and a second curvature that is a curvature of a traveling locus of the reference vehicle, wherein the processor applies the first curvature to the second map as an argument to acquire a corrected steering angle that is a corrected value of a steering angle of the diagnosis target vehicle, the first curvature being a curvature acquired by applying the detection value of the first steering angle sensor to the first map, and performs the driving diagnosis related to the steering of the diagnosis target vehicle based on a corrected curvature-related value that is a value based on the corrected steering angle and the criterion.

3. The vehicle behavior estimation system according to claim 2, wherein
the first map is created based on an average value of values obtained by the first curvature and the detection value of the first steering angle sensor, and
the second map is created based on an average value of values obtained by the second curvature and the detection value of the second steering angle sensor.

4. The vehicle behavior estimation system according to claim 2, wherein the processor creates the first map based on detection values of the yaw rate sensor, the vehicle speed sensor, and the first steering angle sensor of the diagnosis target vehicle.

5. A vehicle behavior estimation method, wherein a processor provided in a diagnosis target vehicle
acquires a first curvature that is a curvature of a traveling locus of the diagnosis target vehicle based on a yaw rate and a vehicle speed of the diagnosis target vehicle, and
performs a driving diagnosis related to steering of the diagnosis target vehicle based on a criterion and a curvature-related value, the criterion being a criterion that defines a relationship between a steering angle-related value that is a value based on a steering angle of a steering wheel of a reference vehicle that is a vehicle different from the diagnosis target vehicle and a behavior of the reference vehicle caused by steering, and the curvature-related value being a value based on the first curvature.

* * * * *